Figure 1:
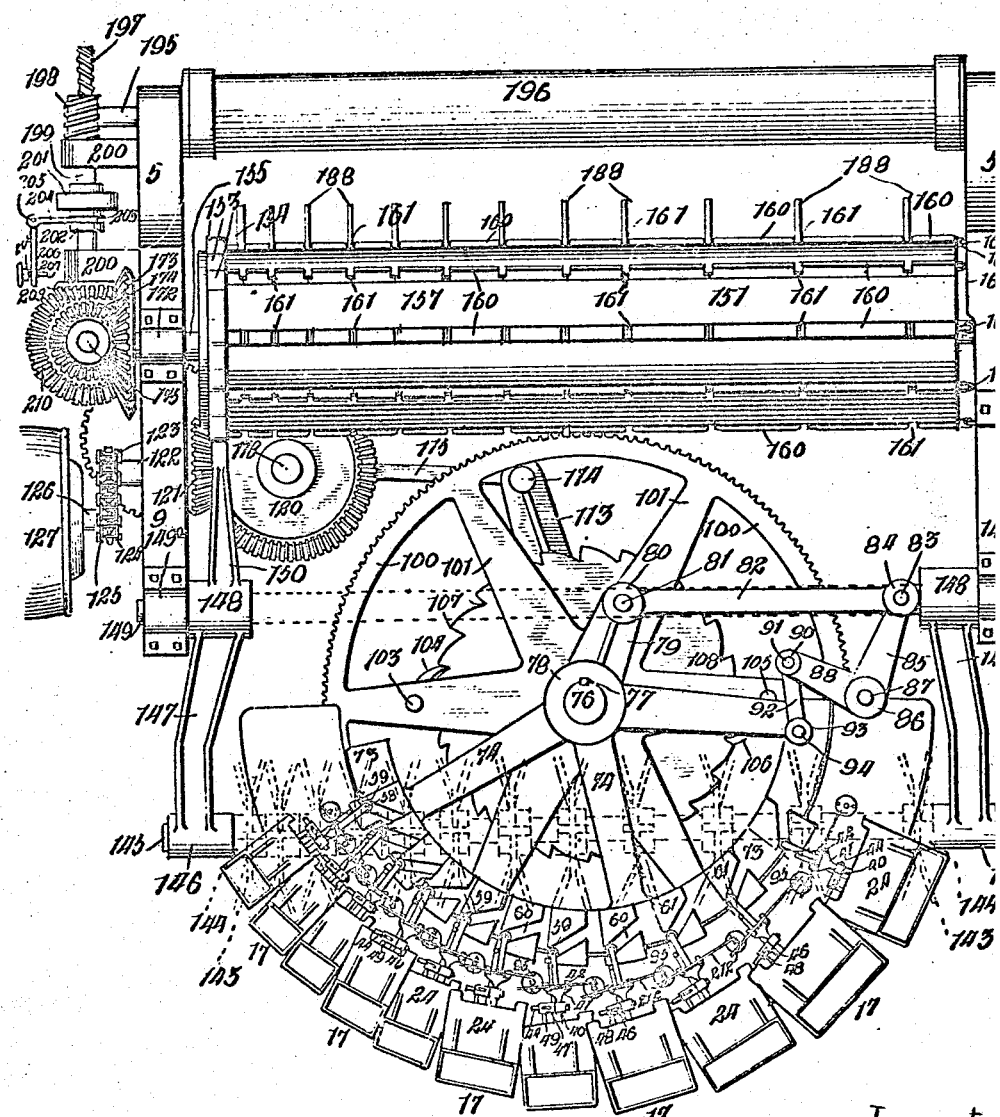

No. 894,971. PATENTED AUG. 4, 1908.
G. E. MIRFIELD.
WIRE FENCE MACHINE.
APPLICATION FILED JUNE 10, 1907.

9 SHEETS—SHEET 1.

Witnesses
Wm. P. Bond
Pierson W. Banning

Inventor
George E. Mirfield
by Banning & Banning
Attys

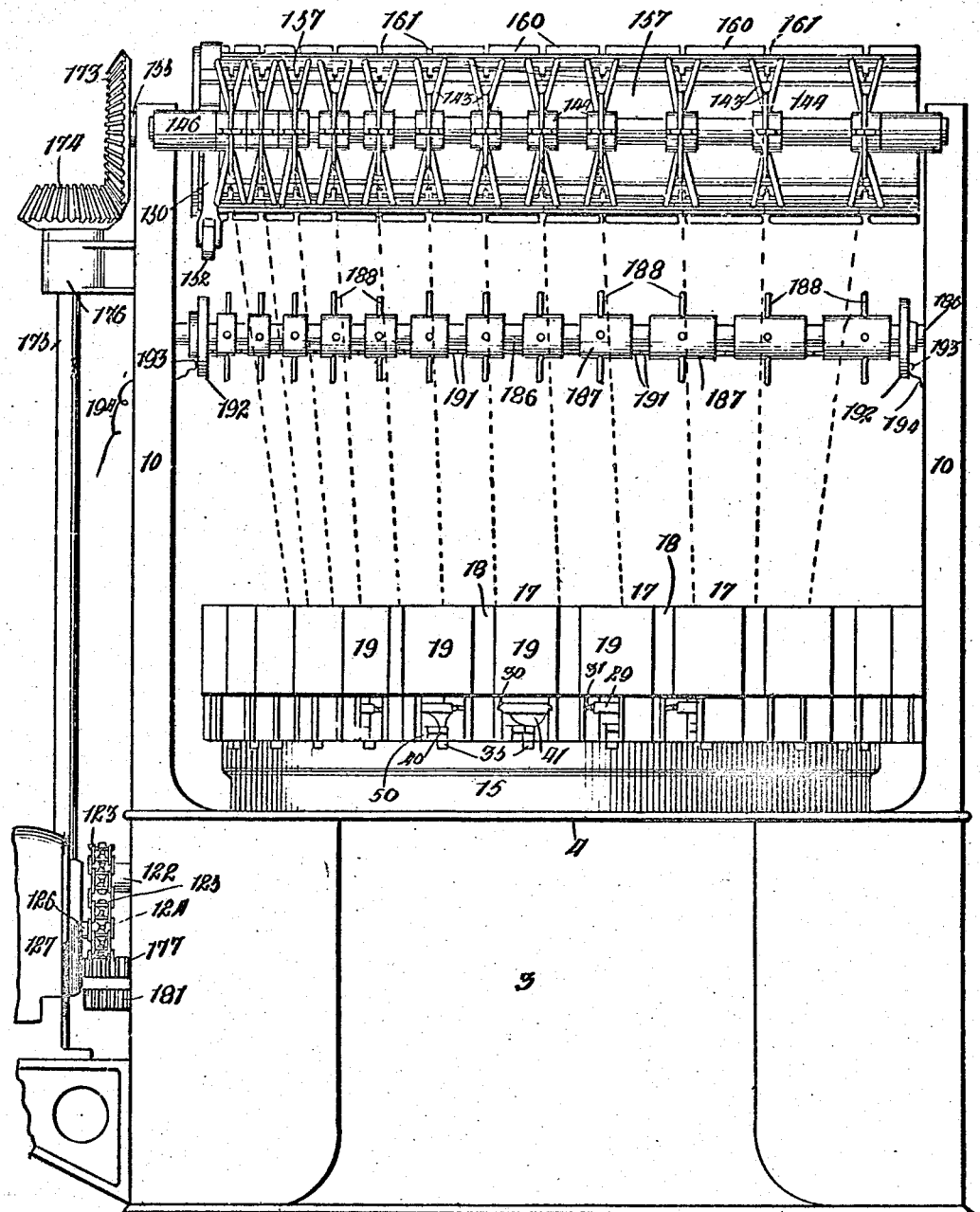

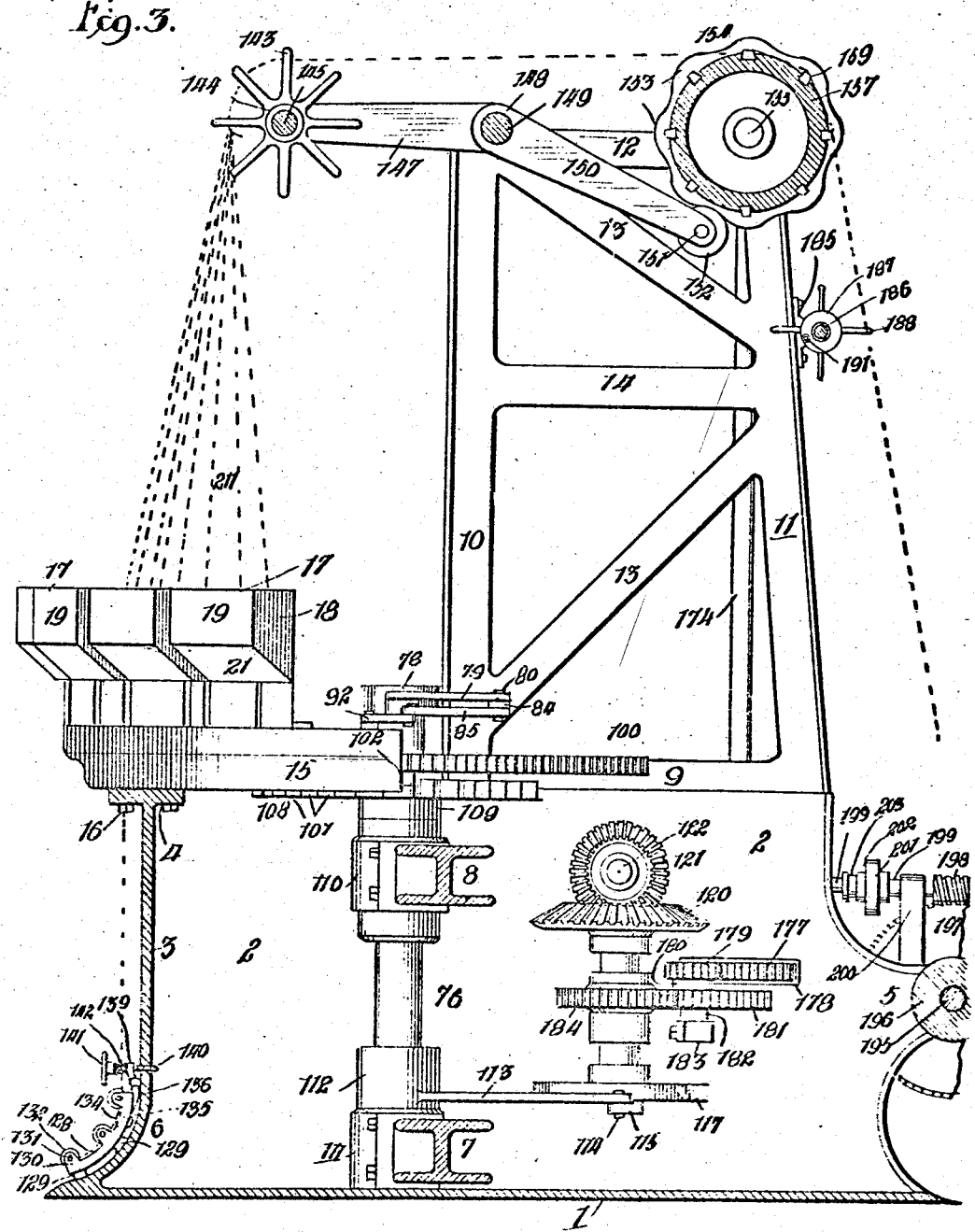

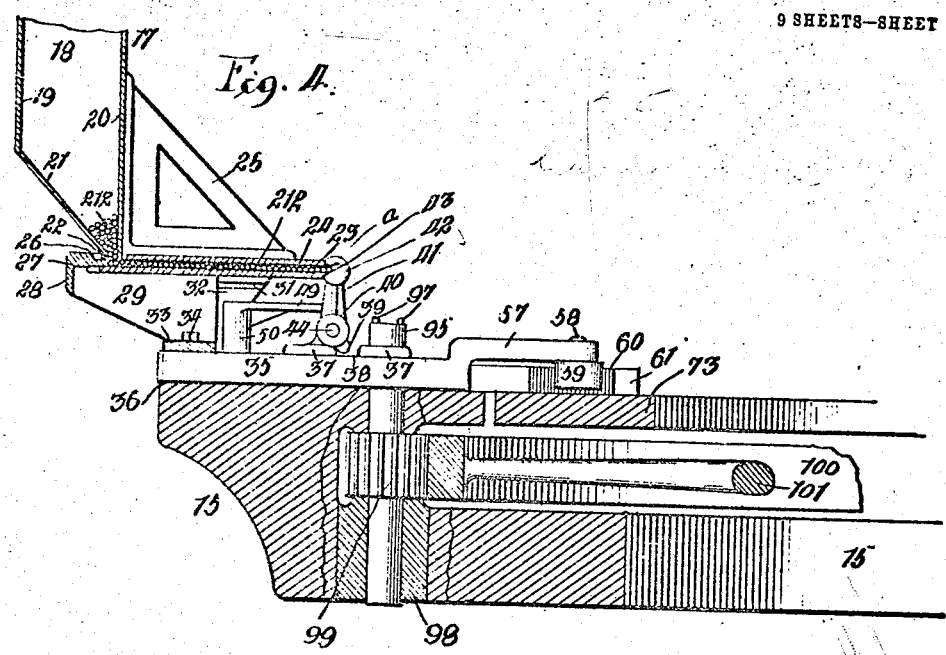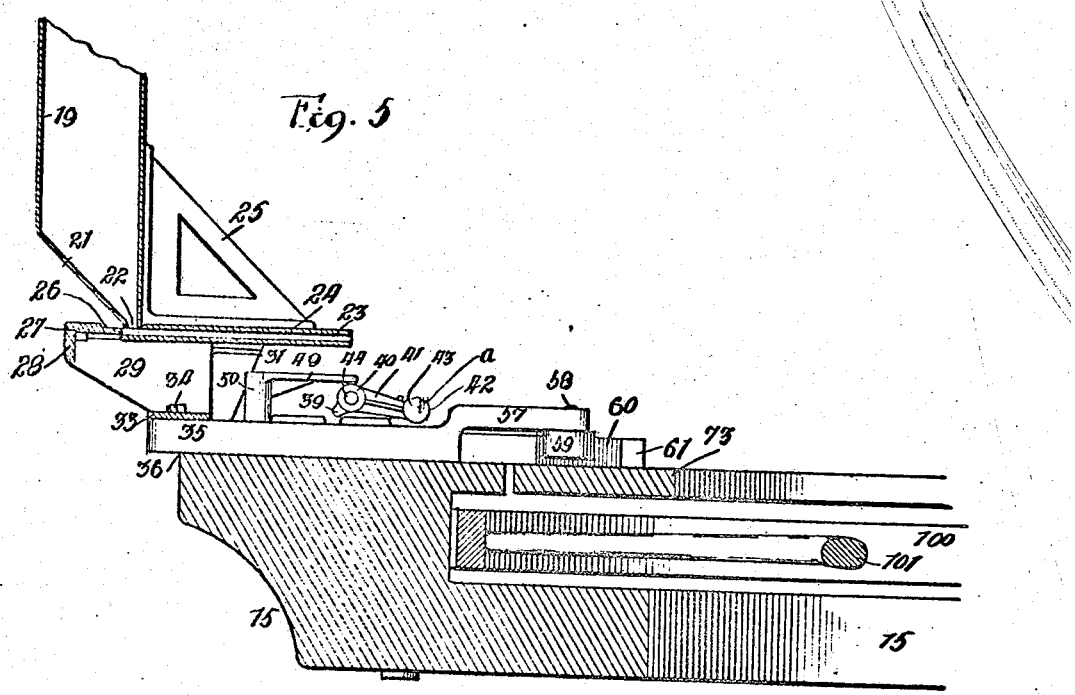

No. 894,971. PATENTED AUG. 4, 1908.
G. E. MIRFIELD.
WIRE FENCE MACHINE.
APPLICATION FILED JUNE 10, 1907.

9 SHEETS—SHEET 5.

Witnesses
Wm. P. Bond
Pierson W. Banning

Inventor:
by George E. Mirfield
Banning & Banning

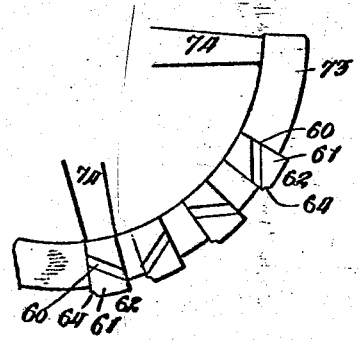
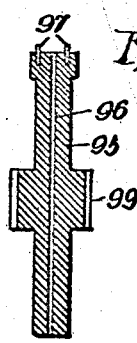
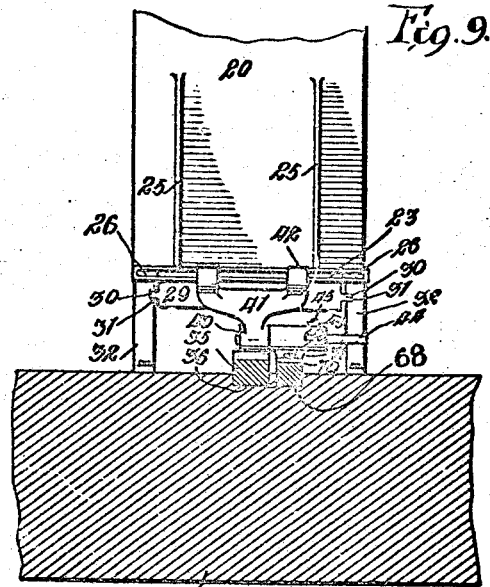
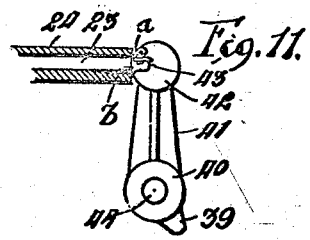
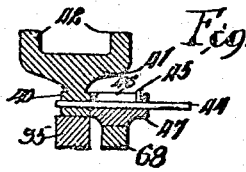

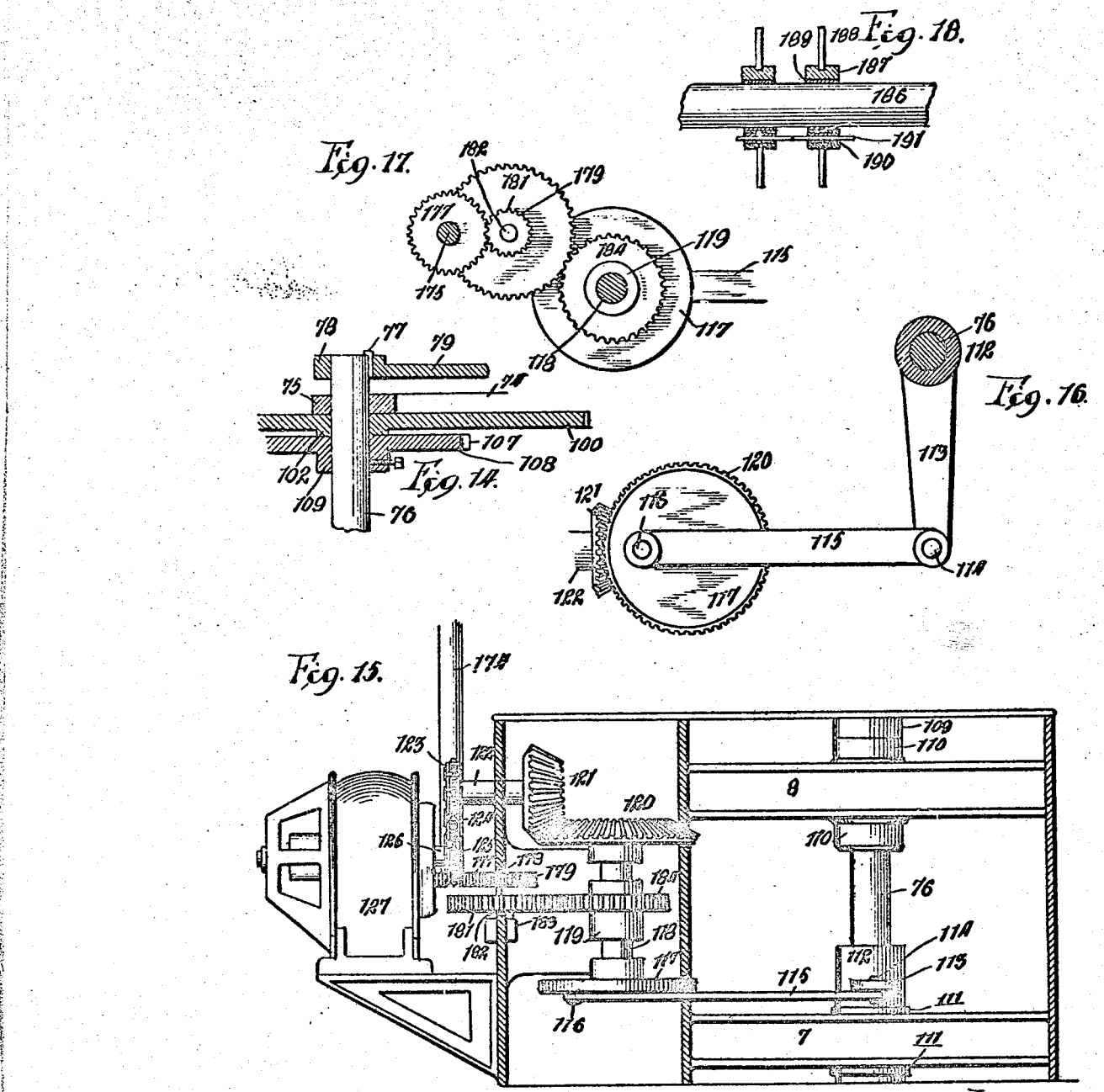

No. 894,971. PATENTED AUG. 4, 1908.
G. E. MIRFIELD.
WIRE FENCE MACHINE.
APPLICATION FILED JUNE 10, 1907.
9 SHEETS—SHEET 8.
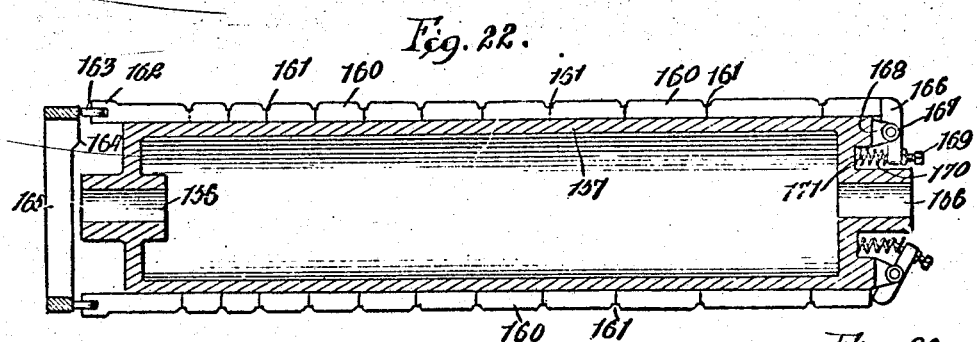
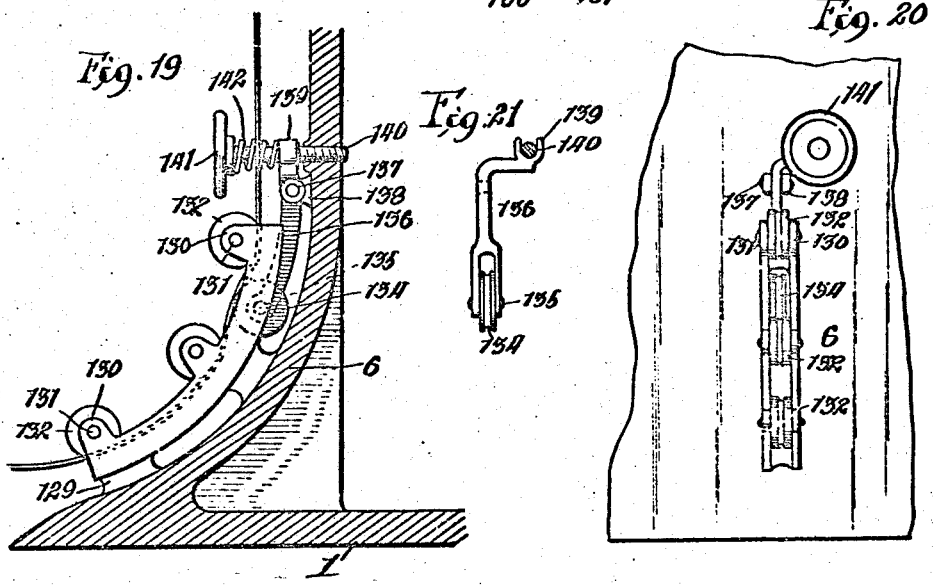
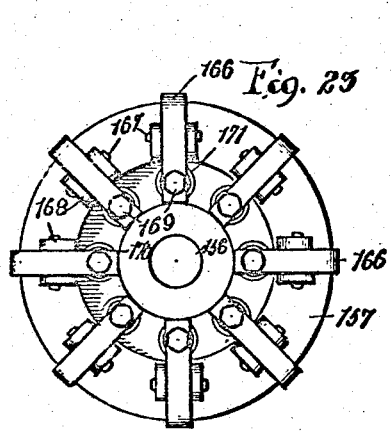
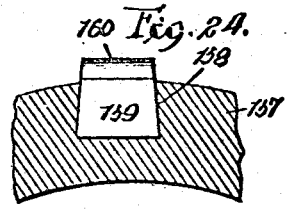
Witnesses
Inventor:

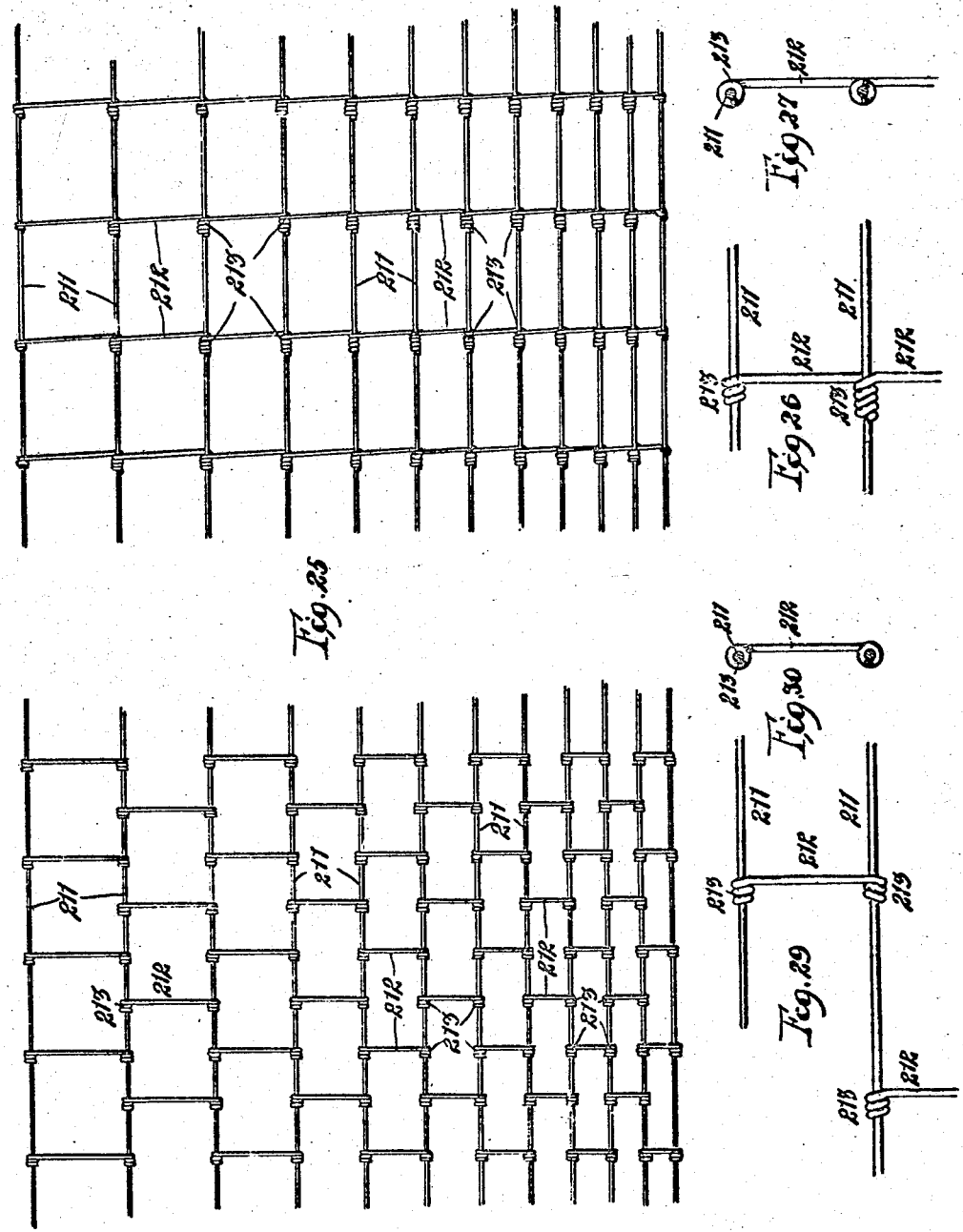

UNITED STATES PATENT OFFICE.

GEORGE E. MIRFIELD, OF JOLIET, ILLINOIS.

WIRE-FENCE MACHINE.

No. 894,971.            Specification of Letters Patent.            Patented Aug. 4, 1908.

Application filed June 10, 1907. Serial No. 378,161.

To all whom it may concern:

Be it known that I, GEORGE E. MIRFIELD, a citizen of the United States, residing at Joliet, in the county of Will and State of Illinois, have invented certain new and useful Improvements in Machines for Making Wire Fence, of which the following is a specification.

This invention relates to machines for making the type of fence having longitudinal or strand wires and cross or stay wires, with the stay wires formed of sections, and the ends of each stay section coiled around the strand wire adjacent thereto.

The objects of the invention are to furnish a plurality of hoppers, each adapted to contain a number of stay sections, with the hoppers so located as to enable a stay section to be delivered across two longitudinal or strand wires; to furnish a conduit for each hopper, into which the stay sections enter, and from which a single stay section is delivered at the proper time; to furnish a dropper for each hopper conduit, each dropper receiving a stay section, and carrying such stay section into position over two strand wires; to furnish a plurality of coiler heads, one for each longitudinal or strand wire and operating to coil the ends of the stay section around two strand wires; to furnish a reciprocating bar and an operating segment having a plurality of cam grooves for operating the reciprocating bar and raising and lowering the dropper for the stay section; to endwise move the dropper of the stay section and carry the stay section into position, for its ends to overlap two longitudinal or strand wires; to give the coiler heads an intermittent rotation after a stay section has been placed in position over two longitudinal or strand wires, for the coiler head to operate and coil the ends of the stay section around the strand wires; to give the dropper receiving the stay sections a rising and falling movement and an endwise movement, for delivering and placing a stay section in position across two longitudinal or strand wires; to furnish means for crimping the strand wires between the stays, by means of a roller carrying a plurality of crimping heads or blocks arranged in series, with openings between the blocks for the passage of the strand wires, and with the blocks or heads endwise movable to crimp the strand wires; to automatically stop the machine in the event of a broken or unattached stay section occurring in the completed fabric; to give the strand wires an intermittent advance coincident with the delivering and placing of the stay sections in position across the strand wires; and to improve generally the construction and arrangement of the various mechanisms and devices entering into the formation of the machine as a whole.

The invention consists in the features of construction and combinations of parts hereinafter described and claimed.

Figure 6:
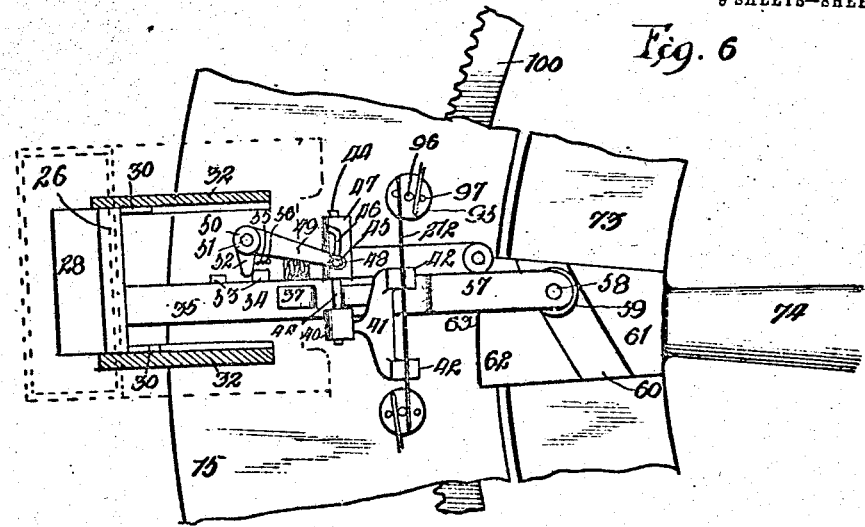
Figure 7:
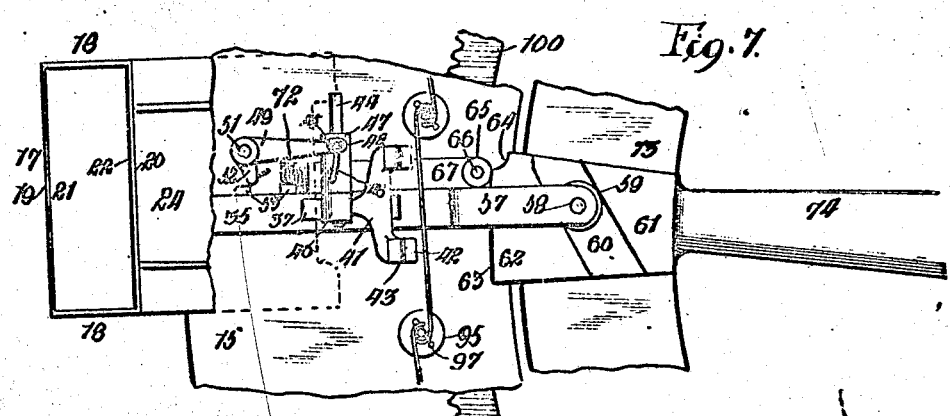
Figure 8:
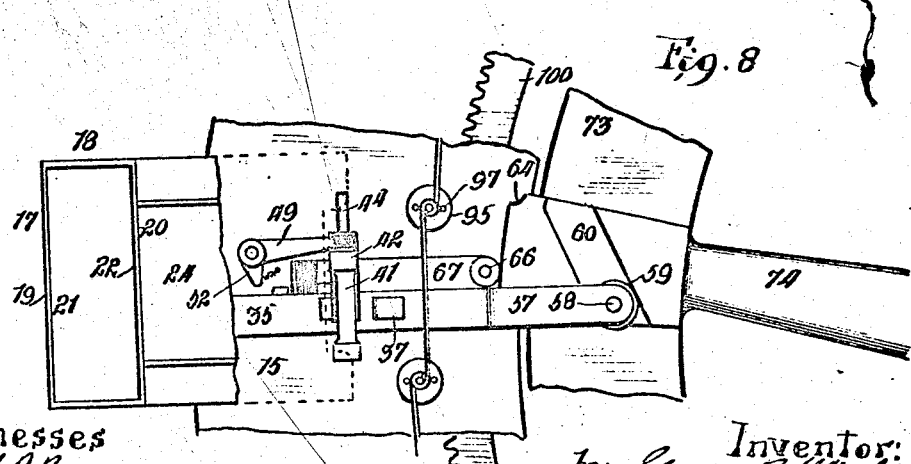

In the drawings Figure 1 is a top or plan view of the machine; Fig. 2 a front elevation of the machine; Fig. 3 a sectional elevation of the machine; Fig. 4 an enlarged detail, partly in section, showing, in elevation, the hopper, the conduit leading therefrom, the pusher for advancing the stay sections in the conduit, the dropper, and the operating means therefor, the coiler or twister head, and the operating means for the coiler or twister head, with the dropper in raised position; Fig. 5 a similar view to Fig. 4, with the stay sections omitted, and with the dropper in its lowermost position; Fig. 6 an enlarged detail, being a top or plan view of a dropper and its operating means, and showing the dropper in position to carry a stay section across the space between two strand wires; Fig. 7 a similar view to Fig. 6, showing the dropper disconnected from the stay section and in position to be raised into receiving position; Fig. 8 a similar view to Fig. 6, showing the dropper in its raised position, and showing the ends of the stay section coiled around the strand wires; Fig. 9 an enlarged detail, showing the hopper, the conduit and the dropper for the stay section in its raised position, with the table and the operating parts for the dropper in section; Fig. 10 a longitudinal section of the dropper; Fig. 11 an enlarged detail, being an end elevation of the dropper and conduit, showing the retaining springs for the stay section; Fig. 12 a longitudinal section of a coiler or twister head and its shaft; Fig. 13 a detail, being a plan view of the oscillating segment with the cam grooves, showing an arrangement of cam grooves for attaching the stay sections in staggered relation to the longitudinal or strand wires; Fig. 14 a detail in sectional elevation of the main driving shaft, the ratchet wheel and the gear, for intermittently rotating the coiler or twister heads; Fig. 15 a side elevation, partly in section, showing an electric motor and the gearing for operating the several mechanisms; Fig. 16 a detail, partly in section, showing the gear and crank arm, for giving a reciprocating movement to the ratchet gear shaft; Fig. 17 a detail, partly in section, showing the connected gear for operating the crimping mechanism; Fig. 18 a detail, partly in section, showing the electrical contact for breaking the circuit and stopping the machine in the event of a broken or unattached stay section; Fig. 19 a detail, partly in section, showing the guide tension and straightening rollers for the longitudinal or strand wires; Fig. 20 a front elevation of the parts shown in Fig. 19; Fig. 21 a detail, being an elevation of the movable guide and straightening wheel or roller of Fig. 19; Fig. 22 a longitudinal section of the crimper; Fig. 23 an end elevation on an enlarged scale of the crimper of Fig. 22; Fig. 24 a detail in section, showing the roller and the crimping block or head of Fig. 22; Fig. 25 an elevation, showing a portion of wire fence fabric having the stay sections united, one to the other, and to the longitudinal or strand wires, by coiling and intercoiling the ends of the stay sections with each other and around the longitudinal or strand wires; Fig. 26 a detail enlarged, showing the construction of Fig. 25; Fig. 27 a cross section of Fig. 26; Fig. 28 an elevation of a portion of a fence fabric, showing the stay sections in staggered relation, with the ends of the sections coiled around the longitudinal or strand wires; Fig. 29 an enlarged detail of the construction shown in Fig. 28; and Fig. 30 a cross section of Fig. 29.

The construction shown has a base or main frame, on which are mounted the various mechanisms of the machine, and this base or main frame, as shown, has a bottom or base plate 1, side plates or walls 2, and a front plate or wall 3, with a flange 4 at the top of the front plate or wall, and each side plate or wall 2 has a rearward bracket arm or support 5, for mounting the shaft of the reel, and the front wall, as shown, has an outward curved bottom 6 for locating and supporting the frame of the guide and straightening rollers or wheels for the longitudinal or strand wires. A lower cross beam 7, and an upper cross beam 8 extend from side plate or wall to side plate or wall in the arrangement shown. A secondary frame extends up from each side wall or plate of the main or base frame, and each secondary frame is formed of a lower rail 9, a front rail 10, a rear rail 11, a top rail 12, bracing rails 13, and an intermediate or cross rail 14, in the construction shown, which rails form a frame support for the crimping mechanism, the take-up roller for the completed fabric, and the mechanism for stopping the machine.

A table or platform 15 is attached by bolts 16, or otherwise, to the flange 4, at the top of the front plate or wall, and this table 15, in the construction shown, is on the arc of a circle, but could be otherwise formed to suit the construction and arrangement of the operating mechanisms of the machine.

The table 15 has mounted thereon a plurality of hoppers 17, each hopper adapted to receive a number of stay sections, previously cut of the required length for the stay sections to cross the space between two adjacent strand wires. Each hopper is formed of two end walls 18, a front wall 19, a rear wall 20, and an inclined bottom 21, with a mouth or opening 22 between the end of the inclined bottom and the end of the rear wall, through which opening the stay sections can pass to enter the passage 23 of the conduit 24, in which passage 23 the stay sections are intermittently advanced, as required to deliver a stay section at the rear end of the conduit, for the delivered stay section to be received by the dropper; and between the conduit 24 and the rear wall 20 of the hopper is a brace 25 connecting the hopper and the conduit. A pusher 26 is located in line with the passage 23 of the conduit, so as to engage the rearmost stay section and push the forward or foremost stay section from the conduit with the advance of the pusher. The bottom wall of the conduit 24 extends back of the upper wall and is entered into a seat 27 below the pusher 26, so as to permit the required movement of the pusher to push out a stay section. The pushers are located, one at each end of the conduit, and are connected by a cross plate 28, between supporting plates 29 located beneath the conduit. Each supporting plate 29 has a lug 30 entering a groove 31, formed in a standard plate 32, supporting the conduit and the hopper on the table or platform 15 in such manner as to locate the conduits in a stepped relation, as clearly shown in Fig. 1, so that each conduit at one corner, will be in advance of the adjoining conduit of the companion hopper, by which arrangement the stay sections can be delivered in an angling relation to the coiler or twister heads, and the longitudinal or strand wires, and in such manner that one end of the stay section is on one side of a longitudinal or strand wire, and the other end of the stay section is on the opposite side of the adjacent longitudinal or strand wire, as shown in Fig. 1, and so that when the stay section is finally in position, for making a stay with the sections in line, the ends of each stay section will be on opposite sides of the strand wires to which the stay section is to be attached.

A bottom plate 33 extends between the end plates or supports 29, and a bolt or bolts 34 connect the bottom plate 33, and with it the pusher, to a reciprocating bar 35 located in a groove 36 formed in the upper face of the table or platform 15, so as to be free to slide back and forth in the groove. The upper face of the reciprocating or slidable bar 35 has thereon two lugs 37, with a space 38 between the lugs, into which space is entered a lug 39 on a sleeve or head 40, extending up from which is an arm or support 41, having at its upper or free end two heads 42, each with a groove or recess 43, for the reception of a stay section, and, as shown, a spring $a$ serves to retain the stay section in the groove or recess 43 when entered thereinto; and, as shown, for the purpose of holding the stay sections in the passage 23 of the conduit, until a stay section is delivered therefrom by the pusher, a spring $b$ is arranged to engage the foremost stay section, and prevent the drop or rolling out of the stay sections.

The sleeve or head 40 is fixedly attached to a pin or shaft 44, which is endwise slidable by means of a pin 45 upwardly extending therefrom and movable in a groove 46 formed in a head or socket 47, through which the slidable shaft or pin 44 passes. The pin 45 enters an opening 48 in the end of an oscillating arm 49, so that, as the arm 49 is oscillated or vibrated the pin 45 will be moved back and forth in the slot 46, carrying with it the pin or shaft 44, and moving the head or socket 40, the arm or support 41, and the heads 42 endwise. The arm 49 extends out from a bearing or sleeve 50, mounted on a pin or journal 51 extending up from the platform or table 15, and this bearing or sleeve 50 has, extending out therefrom, a short arm 52, which is engaged by stops or lugs 53 and 54 on the reciprocating or slidable bar 35, so that, as the bar 35 is reciprocated the stops or lugs 53 and 54 will engage the arm 52 and vibrate or oscillate the arm 49, to move endwise the shaft 44 and the parts carried thereby. A spring 55, attached at one end to the arm 52, and at the opposite end to a pin 56 extending up from the table or platform 15, serves to keep the arm or lug 52 in position for engagement by the lugs 53 and 54 as the bar 35 is reciprocated. Each bar 35 has an extension or arm 57 in a higher plane than the body of the bar, as shown in Figs. 4 and 5, and at the end of the arm 57 is a pin or pivot 58, on which is mounted a roller 59, which enters an inclined or cam groove 60, formed in a plate or head 61, so that as the plate or head 61 is oscillated the inclined or cam groove 60 will engage the roller 59 and give the sliding bar 35 its reciprocating movement. Each plate or head 61 has, at its front end 62, a cam edge 63, terminating at one corner in a depression 64, as shown in Figs. 7 and 8. The cam edge 63 engages a roller 65, mounted on a pivot or pin 66, extending up from a bar 67 slidable in a groove 68, formed in the upper face of the table or platform 15; and to the sliding bar is attached, by a bolt 69, an ear 70, of a web 71, depending from the socket or sleeve 47, so that, as the sliding bar 67 is moved back and forth, a corresponding movement will be given to the socket or sleeve 47, and the pin 44, by which the heads 42 will be carried into position to deliver the stay section to the strand wires, and will be receded so as to clear the stay section as shown in Figs. 6 and 7.

A spring 72 is located between the end wall of the groove 68, and the end of the bar 67, which spring serves to hold the roller 65 against the cam edge 63, and to cause the roller to enter the depression 64 and carry the heads to the limit of their foremost drop, as shown in Fig. 6, for placing the stay section in position to extend between two longitudinal or strand wires.

A segmental plate 73 is located within the periphery of the segmental table or platform 15 in the construction shown, and this plate 73 carries the heads or plates 61 with the inclined or cam grooves 60, so that with the oscillation of the plate 73 the cam grooves will operate and give the sliding bars 35 their reciprocating movement. The segmental plate 73 is attached, by arms or spokes 74, to a collar or sleeve 75 loosely mounted on a vertical shaft 76, to which shaft is attached, by a key 77, the hub 78 of an arm 79 having, at its outer end, a bearing 80, which receives a pivot or journal pin 81, of a connecting link 82, the other end of which is mounted on a pivot or pin 83 which pivot or pin has entered thereonto a collar or eye 84, of an arm or link 85, of a bell crank lever. The arm 85 has an eye or bearing 86 for a pivot or pin 87, extending up from the table or platform 15, and from the eye or bearing 86 the other arm or link 88 of the bell crank lever extends, and has an eye or bearing 90 to receive a pin or pivot 91 of a link 92, the other end of which link has an eye or bearing 93, and is attached to a pin or pivot 94 extending up from the segmental plate 73, as shown in Fig. 1. The shaft 76 has a rocking movement given thereto, and this rocking movement is transmitted to the arm 79, and through the connecting link 82, the bell crank lever, having the arms 85 and 88, and link 92, gives the segmental plate 73 and the cam heads or plates thereon, an oscillating or vibrating movement, by which the several bars 35 are reciprocated to operate the droppers and deliver the stay sections to the strand wires.

The table or platform 15 has mounted therein a plurality of coiler heads 95, each coiler head having a longitudinal hole 96 extending therethrough and through the shaft thereof, and each coiler head, as shown, has two coiling pins 97, projecting out from the upper face of the coiler head on opposite sides of the central longitudinal hole. The shaft or stem of the coiler head is mounted in a bearing 98, and encircling each shaft or stem is a pinion 99, which meshes with a gear wheel 100, the rim of which is connected by spokes 101, with a hub 102 loosely mounted on the shaft 76, and free to revolve on the shaft. One of the spokes of the gear wheel 100 has depending therefrom a pin or pivot 103 of a pawl 104, and the opposite spoke has depending therefrom a pin or pivot 105 of a pawl 106, which pawls 105 and 106 engage the teeth 107 of a circular ratchet 108 keyed to the shaft, so as to oscillate or rock with the shaft. The engagement of the teeth 107, of the circular ratchet 108, with the pawls 104 and 106 move the gear 100 intermittently forward, corresponding to the forward rock of the shaft 76 and the circular ratchet 108, and with the reverse movement of the circular ratchet the pawls 104 and 106 ride over the ratchet teeth and impart no movement to the gear 100, the result being that the gear 100 is given an intermittent forward rotation for intermittently operating the coiler heads in coiling the ends of the stay sections around the longitudinal or strand wires. The coiler or twister heads, at the cessation of each advance or forward rotation of the gear 100, will be brought to normal position for receiving the sections of the next succeeding stay.

The hub 109 of the circular ratchet is keyed or otherwise attached to the shaft 76, and the shaft 76 is supported in an upper journal box or bearing 110, attached to the cross beam 8, and a lower journal box or bearing 111 attached to the lower cross beam 7, as shown in Fig. 3. A collar or sleeve 112 is fixedly mounted on the shaft 76 and has, extending out therefrom, an arm or link 113, the outer end of which carries a pivot or pin 114, to which is attached one end of a pitman or link 115, the other end of which pitman or link is attached to a wrist pin 116, eccentrically located on a disk 117 fixedly attached to a shaft 118, supported in suitable journal boxes or bearings 119 attached to one side wall or plate of the main or base frame. The shaft 118, at its upper end, has fixed thereon a bevel gear 120, which meshes with a bevel pinion 121 on a shaft 122 supported in suitable journal boxes or bearings on the side plate or wall of the main or base frame, and the shaft 122 has thereon a sprocket wheel 123, over which a driving sprocket chain 124 runs from a sprocket wheel 125 on the shaft 126 of an electric motor 127, in the construction shown. It will be seen that the rotation of the disk 117, through the pitman or link 115, oscillates or vibrates the arm 113, and, through the collar or sleeve 112 rocks the shaft 76, giving the circular ratchet 108 and the arm 79 an oscillating or rocking movement, for the circular ratchet to transmit an intermittent rotation to the gear 100, and for the arm 79 to give an oscillating or vibrating movement to the plate 73 and the parts carried by said plate.

The curved bottom 6 of the front wall or plate of the base or main frame, in the construction shown, has secured thereto a plurality of frames 128, each frame attached to the wall by lugs or webs 129, so as to have a fixed relation. Each frame, as shown, has a plurality of ears 130, arranged in pairs, and each pair of ears carries a pivot or journal pin 131, of a grooved roller or wheel 132, so that the rollers or wheels 132 will be on the arc of a circle. A grooved roller or wheel 134 is located in the space between the upper and intermediate grooved rollers or wheels 132, and this groove roller or wheel 134 is carried by a journal pin or pivot 135, mounted in the forked lower end of an arm 136, as shown in Fig. 1; and the arm 136 is mounted on a pivot or pin 137 supported in ears 138, extending out from the front wall of the base or main frame, as shown in Fig. 19. The upper end of each movable arm 136 has an eye 139, for the passage of a threaded stem 140, on which is a hand wheel 141, between the hub of which hand wheel and the face of the eye 139 is a coiled spring 142, giving the arm 136 a yielding movement, to compensate for the stiffness of and the kinks or bends in the longitudinal or strand wire and maintain the proper tension for these wires. The threaded stem 140 is entered into a hole in the front wall, so that the stem can be advanced or receded, and cause the coiled spring 142 to act with more or less force on the upper end of the arm 136, and give the roller or wheel 134 a greater or less frictional bearing on the longitudinal or strand wire. The longitudinal or strand wire passes below the grooved rollers or wheels 132 and above the grooved roller or wheel 134, so that the wire coming from the spool will be straightened for passage up and through the shaft and the coiler or twister head freely and without liability of becoming stuck in the longitudinal hole of the coiler or twister head and its shaft. A series of wheels, each wheel formed with a V shaped opening in or between the outwardly spread arms or spokes 143 radiating from a hub 144, furnish the take-up and carrying wheels for the completed fabric after the stay sections are attached to the longitudinal or strand wires. The hub 144 of each wheel is mounted on a shaft 145 supported in journal boxes or bearings 146 at each end of the shaft. Each journal box or bearing 146 is on the end of an arm 147, and each arm 147 has a collar or bearing 148, mounting the arm on a rock shaft 149, which is supported in suitable journal boxes or bearings 149$^a$ on the upper rail 9 of the secondary frame, so that the arms 147 are free to oscillate or vibrate with the supporting shaft.

Extending rearwardly from one collar or sleeve 148 is an arm 150, having at its end a journal pin or pivot 151 carrying a roller 152, which engages with the scalloped edge 153 of a plate 154, so that, as the plate 154 is revolved, the scalloped edge or trackway 153 will cause the wheel to be alternately depressed and elevated, rocking the shaft 149 and giving a rising and falling movement to the butterfly wheels, for such wheels to act and give an intermittent advance to the longitudinal or strand wires and the fabric, after the stays have been attached to the longitudinal or strand wires, or, in other words, furnish a take-up by which the longitudinal or strand wires are given an intermittent advance, to enable the coiler or twister heads to act while the longitudinal or strand wires are stationary, and coil the ends of the stay sections around the longitudinal or strand wires.

The plate 154, with its scalloped edge or track 153 is mounted on and revolves with a shaft 155, on which are fixedly mounted the hubs or sleeves 156, one at each end of a crimping roller 157, for the roller to revolve with the shaft. The exterior face of the crimping roller 157 has therein a plurality of longitudinal grooves 158, and each groove 158 receives a series of blocks 159, the blocks endwise contacting each other, as shown in Fig. 22. Each block 159 has an upper face 160, and between the several upper faces, and in line with the contacting ends of the blocks or heads, is a recess 161 to receive the longitudinal or strand wire. One end block, or head, 160, has a fork 162, in which is mounted a roller 163 arranged to engage a cam having a raised or projected edge face 164 and a depressed edge face 165, which cam is mounted on or secured to an upper rail 9 of one side of the secondary frame. Each row of blocks or heads has, in line therewith, a finger 166, each finger mounted on a pin or pivot 167 between ears 168, extending out from the end of the crimping roller, and each finger 166 has an adjusting screw 169, entered into one end of a coiled spring 170, located in a recess or hole 171, formed in the end plate of the crimping roller, so that the spring will act against the tail end of the finger 166 and force the tail end of the finger outward, as shown in Fig. 2, for the finger to carry endwise the row of crimping blocks or heads into the position, shown on the under side of Fig. 2, in which position the strand wires enter the recess 161 and will be crimped as the row of blocks or heads are forced endwise in the opposite direction by the engagement of the roller 163 with the projected edge 164 of the cam, and such endwise movement of the row of blocks or heads will crimp or bend each longitudinal or strand wire, and with the passage of the roller 163 over the projected edge 164 of the cam, the spring 170 acts against the tail end of the finger and forces the row of blocks endwise to normal or receiving position for the longitudinal or strand wires.

The continuously revolving shaft 155, carrying the plate 154 and the crimping roller, is mounted in suitable journal boxes or bearings 172 on the top rails of the secondary frame, and the shaft 155 at one end has fixedly mounted thereon a bevel gear 173 which meshes with a bevel gear 174 fixedly attached to the upper end of a vertical shaft 175, which shaft is supported in suitable journal boxes or bearings 176 extending out from one secondary frame. The shaft 175, at its lower end, has fixedly mounted thereon a spur gear 177, which projects through a slot 178 formed in the end wall 2 of the main or base frame, for the spur gear 177 to mesh with a spur pinion or gear 179 connected by a hub 180 with a spur gear 181, on a stud shaft 182 mounted in a suitable bearing, the journal boxes 183 extending out from the end wall of the main or base frame. The spur gear 181 meshes with a spur gear 184, fixedly mounted on the shaft 118, so that the continuous rotation of the shaft 118 from the bevel gears 120 and 121 and shaft will, through the train of gears 181, 179 and 177, continuously revolve the vertical shaft 175, and through the bevel gears 173 and 174 continuously revolve the shaft 155 and the devices carried by such shaft. The crimping roller has a continuous revolution, and by its engagement with the longitudinal or strand wires, would continuously feed forward or advance such wires, but such continuous revolution is interrupted by the action of the take-up roller having the wheels formed of the spokes 143 and hubs 144, which roller, by dropping, produces or causes a temporary slack of the longitudinal or strand wires, which slack continues a sufficient length of time for the coiler or twister heads to operate and coil or twist the ends of the stay section around the longitudinal or strand wires, and at the terminus of the coiling operation the take-up roller is raised by the action of the plate or disk 154, with its track 153, and such raising and upward movement of the take-up roller will pull the longitudinal or strand wires upwardly faster than the travel of the crimping roller, thus giving an intermittent feed for the longitudinal or strand wires.

A journal box or bearing 185, is attached to the rear face of each upright or rail 11 of the secondary frame, and in these journal boxes or bearings is fixedly mounted a shaft 186, which shaft has loosely mounted thereon a plurality of collars 187, and each collar has radiating out therefrom pins or spokes 188, to contact the stays of the completed fabric. Each collar 188 is free to revolve on the shaft 186, and is insulated from the shaft by a strip 189 of suitable insulated material, and each collar has entered thereinto a sleeve 190 of suitable insulating material, which sleeve carries a contact pin 191, with the contact pins so arranged as to form a continuous line of contact through all of the collars, when the ends of the pins abut one against the other. On the shaft, at each end of the series of contacts, is mounted a disk 192 having a binding screw or post 193, to which is connected a wire 194, leading to a controller, for the electric motor 127, completing an electric circuit from the motor. The circuit from the electric motor will remain perfect so long as the several contacts have the pins in end engagement, which will be the case if all of the stay sections are united to the longitudinal or strand wires, but in the event a stay section is broken or is not attached at its ends to the longitudinal or strand wires, such stay section, when engaging the contact wheel in line therewith, will not turn it in unison with the remaining contacts, and such non-turning of a contact breaks the circuit of the contact pins and interrupts the current from the motor, stopping the motor and with it the mechanisms driven thereby. It will thus be seen that an automatic cut out for the motor, and a positive stopping of the mechanisms, is obtained by the circuit breaker formed by the series of wheels and their contact pins.

A shaft 195 is mounted in suitable bearings in the ears or extended brackets 5 of the secondary frame, and on this shaft is mounted a spool 196 for the completed fabric to be wound thereon, which spool can be of any usual and well known construction. The shaft 195, at one end, has fixed thereto a gear wheel 197, in mesh with which is a worm gear 198 on a shaft 199, mounted in suitable bearings in supports or brackets 200, extending out from the main or base frame. The shaft 199 is a divided shaft, and one section thereof has one member 201 of a friction clutch, the other member 202 of which clutch is attached to the other section of the divided shaft. The member 202 of the friction clutch has a groove 203, in which is entered the arm 204 of an L lever, which lever is mounted on a suitable pin or pivot 205, and the other member 206 thereof is engaged by an adjusting screw 207 carried by a post or support 208, so that by turning the hand wheel of the adjusting screw the movable member 202 of the friction clutch can be moved forward or back, so as to increase or decrease the frictional engagement, and give the proper revolution to the reel shaft, for winding the completed fabric on the spool. The driving shaft 199, at one end, has a bevel gear 209, meshing with a bevel gear 210 on the vertical shaft 175, so that the crimper and the reel shaft will be revolved in unison for taking up and disposing of the completed fabric.

The strand wires 211, to the number required for the height of fence, or the wires for the fence, pass between the straightening rollers or wheels 132 and 135, and are upwardly extended, each through its coiler or twister head and the shaft of the head, and the advance end of each strand wire is caught by the crimping roller, so as to be held firmly in the recesses of the roller. The stay sections, of the required length to extend across the space between the respective longitudinal or strand wires, are placed in the respective hoppers therefor, and these stay sections 212 pass from the hopper into the feeding passage 23, and are pushed therefrom and delivered to the longitudinal or strand wires by the droppers, as hereinbefore described.

The operation will be understood from the foregoing description, but briefly is as follows: The strand wires are threaded into the machine, for a strand wire to pass through each coiler or twister head and its shaft, and the stay sections are placed in their hoppers, and with the longitudinal or strand wires properly threaded into the machine and the stay sections in the hoppers, the machine is ready for operation.

At the start of the machine the cam carrying plate 73 should be in position for the roller 59 of each sliding bar 35 to be engaged by the lowest point of its inclined or cam groove 60, and as the plate 73 is moved in the direction for the lowest point of the inclined or cam grooves to engage the rollers, and each sliding bar 35 will have reached the limit of its advance movement or throw, and will have raised the dropper actuated by each sliding bar, for all of the droppers to stand in their receiving position shown in Fig. 4, and at the same time each sliding bar, as its advance is completed, will have carried forward the pusher operated thereby, for each pusher, by its advance, to eject a stay section into the groove or recess 43 of the dropper head 42, for the stay section to be carried down by the dropper for delivery to the coiler heads and the strand wires.

The opposite or return travel or swing of the cam carrying plate 73 causes each inclined or cam groove 60 to engage its roller 59 and simultaneously recede the several sliding bars 35 from their advance position, bringing the forward lug 37 on each sliding bar into contact with the coacting lug or finger 39, rocking each head 40 on its pin 44, and swinging the dropper as a whole downward, each dropper carrying with it the stay section, received thereinto at the completion of the advance throw of the sliding bar. The downward movement of each dropper continues during the recession of each sliding bar, and as the highest point of the inclined or cam groove 60 engages the roller, the dropper will be fully lowered, and with it the stay section carried thereby.

Each roller 65, during the operation of raising and lowering each dropper rides on the track or face 63 therefor, so as to raise each dropper, and when raised maintain it in position for receiving a stay section and to lower each dropper and deliver the stay section, and when each dropper is lowered, each arm 52 is contacted by the lug 54, of its sliding bar 35, so as to swing each arm 49 toward the sliding bar 35, and, through the pin 45, move each dropper endwise, carrying with it the stay section and placing the stay section, with its ends between the coiling pins of two of the coiler heads and the strand wires of the same coiler heads, as shown in Fig. 6, which movement occurs when each roller 65 leaves the track or face 63 and enters the depression or recess 64, thereby carrying each dropper further forward and placing the stay section in position for the endwise movement of each dropper to enter the ends of the stay section between the coiling pins and strand wires of two coilers. The commencement of the return swing of the cam carrying plate 73 to its first position, causes each roller 65 to pass out of the depression or recess 64 therefor and onto its track or face 63, giving each dropper a receding movement to clear it from the stay section, so that as each cam or inclined groove continues in contact with its coacting roller 59, each sliding bar 35 will be advanced to the position first described, and in such advance the rearmost lug 37 on each sliding bar will contact the coöperating lug or finger 39, and rock the head 40, raising each dropper into upright receiving position, and carrying each pusher into position to eject a stay section from the conduit as hereinbefore described; and during such advance of each sliding bar 35, the lug 53 thereon will contact the arm 52 and swing each arm 49 away from the sliding bar, causing each pin 45 to endwise move each pin 44, and with it the dropper, for each dropper, when raised, to receive, in the recess or groove of its head, the next succeeding stay section. The coiler heads, after the stay section has been positioned so as to cross the space between two strand wires, with the ends overlapping the strand wires, as shown in Fig. 6, or otherwise, are simultaneously revolved by the engagement of the gear 100 with the pinion 99 of each coiler shaft, thereby coiling the ends of the stay sections around the strand wires, which operation occurs after the droppers have been disengaged from the stay sections and during the period of time that the droppers are raised and lowered to deliver the next succeeding stay section. The gear 100 is intermittently revolved by means of the circular ratchet and the pawls on the gear, and such intermittent rotation occurs, after the stay sections have been placed in position over the coiler heads and adjacent to the strand wires. The rotation of the gear can be one to produce two or more coils of the stay section ends around the strand wires. The take-up roller, during the coiling operation, is dropped or lowered so as to stop the advance of the strand wires until the completion of the coiling operation, at which time the take-up roller is elevated, drawing a sufficient length of strand wire for the spacing of the next stay section, so that with the drop of the take-up roller sufficient slack will be provided for the continuous operation of the crimping roller, thus producing an intermittent advance for the strand wires.

The crimping roller receives, between the crimping blocks or heads in the recesses 161, the strand wires; and, as the blocks or heads 160 are moved endwise, by the projected edge 154 of the cam, a crimp will be produced in each strand wire, and at the same time the heads or blocks act as jaws to hold the strand wires and insure the proper advance of the fabric, after the stay sections have been attached thereto. The completed fabric, after having the strand wires crimped, is wound onto a spool for final disposition, and the spool is mounted on the shaft 195, which shaft is driven at the requisite speed, through the friction clutch on the shaft 199, so as to revolve the spool at the proper speed to coincide with the delivery of the completed fabric from the crimping roller.

The machine is stopped through the cut out, formed by the contact collars and pins, by the failure of a broken or unattached stay section to engage with and move a pin, thus stopping the machine without any assistance from the operator, and enabling the operator to make the necessary repair of the fabric, by inserting a new stay section, or properly attaching the unattached stay section.

The timing of the different mechanisms will be understood from the description of the operation, and while the construction and arrangement shown has the coiler heads and the hoppers and the coöperating devices arranged on a semi-circle, it is to be understood that the coiler heads, the hoppers and the coöperating devices can be arranged in a straight line, and when arranged in a straight line a reciprocating slide for the cams which raises and lowers the droppers and a reciprocating rack bar engaging the pins on the shaft of the coiler or twister heads is to be employed in place of the segmental plate carrying the cams and the intermittently rotatable gear for operating the coiler heads.

The arrangement shown in Fig. 1 has the inclined or cam grooves running in the same direction, and with this construction the machine will produce a square mesh fence fabric of the form shown in Figs. 25, 26 and 27, in which the stay sections have their ends intercoiled and coiled around the longitudinal or strand wires. The type of fence shown in Figs. 28, 29 and 30, in which the stay sections are in staggered relation can be made on the machine of the present invention without any change in the mechanisms except in arranging the inclined or cam grooves to have alternate grooves run in the same direction, as shown in Fig. 13, in which arrangement one division of the pushers, droppers and coilers will be advanced as the other division of these parts is receded, such advance and recession alternating with the divisions. The operation of the pushers, droppers, coiler or twister heads, take-up roller, crimping roller and spooling the completed fabric is the same as described for the construction of fence shown in Fig. 25, and, therefore, need not be repeated. It will thus be seen that by merely changing the run of the inclined or cam groove so as to have in one case the grooves all run in the same direction and in another case have alternate grooves run in the same direction the machine is capable of producing a sectional stay square mesh fence in which the stay sections are in line with their ends intercoiled and coiled around the longitudinal or strand wires as in Fig. 25 when the inclined or cam grooves all run in the same direction, and of producing a square mesh fence in which the stay sections are in staggered relation, as shown in Fig. 28, when alternate inclined or cam grooves run in the same direction, and this without changing the other mechanisms of the machine.

While I have described the arrangement, combination, and operation of the various parts and devices, that enter into the construction of my machine, with considerable minuteness of detail, so that the manner of making and using my invention would be clearly understood, yet I do not desire to limit myself more closely to forms, details of construction, and arrangement of parts, than the state of the art may require, except where I have specified or called for such matters in my claims, because, as I am well aware, many changes can be made in matters of form and details of construction without departing from the spirit of my invention or impairing the efficiency and utility of its operation.

What I claim as new and desire to secure by Letters Patent is:

1. In a wire fence machine, the combination of mechanism for intermittently advancing a plurality of strand wires, a plurality of hoppers, each hopper adapted to contain previously formed stay sections, means for feeding stay sections one at a time from each hopper, and means for receiving the single stay section fed from each hopper and delivering the same to the strand wires, substantially as described.

2. In a wire fence machine, the combination of mechanism for intermittently advancing a plurality of strand wires, a plurality of hoppers, each hopper adapted to contain stay sections, means for delivering a single stay section from each hopper to the strand wires, and means for endwise moving the stay sections for the stay section at each end to overlap a strand wire, substantially as described.

3. In a wire fence machine, the combination of mechanism for intermittently advancing a plurality of strand wires, a plurality of hoppers, each hopper adapted to contain stay sections, means for delivering a single stay section from each hopper to the strand wires, means for endwise moving the stay sections for the stay section at each end to overlap a strand wire, and means for coiling the ends of the stay sections around the strand wires, substantially as described.

4. In a wire fence machine, the combination of mechanism for intermittently advancing a plurality of strand wires, a plurality of hoppers, each hopper adapted to contain stay sections, means for delivering a single stay section from each hopper to the strand wires, means for endwise moving each delivered stay section across two adjoining strand wires, with the ends of each stay section overlapping each other and the strand wires, and means for intercoiling the stay section ends with each other and around the strand wires, substantially as described.

5. In a wire fence machine, the combination of mechanism for intermittently advancing a plurality of strand wires, a plurality of hoppers, each hopper adapted to contain sections of a stay wire, means for feeding a stay section from each hopper, means for delivering the fed stay section to the strand wires, means for endwise moving each stay section for the ends to overlap the strand wires, and means for coiling the overlapped ends of each stay section around the strand wire, substantially as described.

6. In a wire fence machine, the combination of mechanism for intermittently advancing a plurality of strand wires, a plurality of hoppers, each hopper adapted to contain sections of a stay wire, means for feeding a stay section from each hopper, means for delivering the fed stay section to the strand wires, means for endwise moving each stay section for the ends to overlap each other and the strand wires, and means for intercoiling the stay section ends with each other and around the strand wires, substantially as described.

7. In a wire fence machine, the combination of mechanism for intermittently advancing a plurality of strand wires, a plurality of hoppers, each hopper adapted to contain stay sections, a pusher for removing a stay section from each hopper, and a dropper for each hopper, each dropper receiving the removed stay section from each hopper and delivering the section to the strand wires, substantially as described.

8. In a wire fence machine, the combination of mechanism for intermittently advancing a plurality of strand wires, a plurality of hoppers, each hopper adapted to contain stay sections, a pusher for removing a stay section from each hopper, a dropper for each hopper, each dropper receiving the removed stay section from each hopper, and delivering the section to the strand wires, and means for endwise moving each dropper to have the ends of the stay sections overlap the strand wires, substantially as described.

9. In a wire fence machine, the combination of mechanism for intermittently advancing a plurality of strand wires, a plurality of hoppers, each hopper adapted to contain stay sections, a pusher for removing a stay section from each hopper, a dropper for each hopper, each dropper receiving the removed stay section from each hopper, and delivering the section to the strand wires, means for endwise moving each dropper to have the ends of the stay sections overlap the strand wires, and means for returning each dropper to receiving position, substantially as described.

10. In a wire fence machine, the combination of mechanism for intermittently advancing a plurality of strand wires, a plurality of hoppers, each hopper adapted to contain stay sections, a pusher for removing a stay section from each hopper, a dropper for each hopper, each dropper receiving the removed stay section from each hopper, and delivering the section to the strand wires, means for endwise moving each dropper to have the ends of the stay sections overlap the strand wires, and a plurality of coiler heads, one coiler head for each strand wire, engaging the overlapping ends of the stay sections and coiling such ends around the strand wires, substantially as described.

11. In a wire fence machine, the combination of mechanism for intermittently advancing a plurality of strand wires, a plurality of hoppers, each hopper adapted to contain stay sections, a pusher for removing a stay section from each hopper, a dropper for each hopper, each dropper receiving the removed stay section from each hopper and delivering the section to the strand wires, means for endwise moving each dropper to have the ends of the stay sections overlap the strand wires, a plurality of coiler heads, one coiler head for each strand wire, engaging the overlapping ends of the stay sections and coiling such ends around the strand wires, and means for simultaneously revolving the plurality of coiler heads and coiling the ends of the stay sections around the strand wires, substantially as described.

12. In a wire fence machine, the combination of mechanism for intermittently advancing a plurality of strand wires, a plurality of hoppers, each hopper adapted to contain stay sections, a pusher for removing a stay section from each hopper, a dropper for each hopper, each dropper receiving the removed stay section from each hopper and delivering the section to the strand wires, means for endwise moving each dropper to have the ends of the stay sections overlap the strand wires, a plurality of coiler heads, one coiler head for each strand wire, engaging the overlapping ends of the stay sections and coiling such ends around the strand wires, means for simultaneously revolving the plurality of coiler heads and coiling the ends of the stay sections around the strand wires, and means for crimping the strand wires between the stays, substantially as described.

13. In a wire fence machine, the combination of mechanism for intermittently advancing a plurality of strand wires, a plurality of hoppers, each hopper adapted to contain stay sections, a pusher for removing a stay section from each hopper, a dropper for each hopper, each dropper receiving the removed stay section from each hopper and delivering the section to the strand wires, means for endwise moving each dropper to have the ends of the stay sections overlap the strand wires, a plurality of coiler heads, one coiler head for each strand wire, engaging the overlapping ends of the stay sections and coiling such ends around the strand wires, a pinion for each coiler head, an intermittently revolvable gear common to all of the pinions of the coiler heads, and means for intermittently revolving the gear, substantially as described.

14. In a wire fence machine, the combination of mechanism for intermittently advancing a plurality of strand wires, a plurality of hoppers, each hopper adapted to contain stay sections, a pusher for removing a stay section from each hopper, a swinging dropper for each hopper, each dropper receiving the removed stay section from each hopper, and delivering the section to the strand wires, means for endwise moving each dropper to have the ends of the stay sections overlap the strand wires, a plurality of coiler heads, one head for each strand wire, engaging the overlapping ends of the stay sections and coiling such ends around the strand wires, a pinion for each coiler head, an intermittently revolvable gear common to all of the pinions of the coiler heads, means for intermittently revolving the gear, and means for crimping the strand wires, substantially as described.

15. In a wire fence machine, the combination of mechanism for intermittently advancing a plurality of strand wires, a plurality of fixed hoppers arranged in a semi-circle, each hopper adapted to contain previously formed stay sections, means for feeding stay sections one at a time from each hopper and means for receiving the single stay section fed from each hopper and delivering the same to the strand wires, substantially as described.

16. In a wire fence machine, the combination of mechanism for intermittently advancing a plurality of strand wires, a plurality of hoppers arranged in a semi-circle and each hopper adapted to contain stay sections, means for delivering a single stay section from each hopper to the strand wires, and means for endwise moving the several delivered stay sections for the ends of each stay section to overlap adjacent strand wires, substantially as described.

17. In a wire fence machine, the combination of mechanism for intermittently advancing a plurality of strand wires, a plurality of fixed hoppers arranged in a semi-circle and each hopper adapted to contain stay sections, means for delivering a single stay section from each hopper to the strand wires, means for endwise moving the several stay sections for the ends of each stay section to overlap adjacent strand wires, and means for coiling the ends of the stay sections around the strand wires, substantially as described.

18. In a wire fence machine, the combination of mechanism for intermittently advancing a plurality of strand wires, a plurality of hoppers arranged in a semi-circle and each hopper adapted to contain stay sections, means for delivering a single stay section from each hopper to the strand wires, and means for endwise moving each delivered stay section across two adjacent strand wires, with the ends of each stay section overlapping each other and the strand wires, substantially as described.

19. In a wire fence machine, the combination of mechanism for intermittently advancing a plurality of strand wires, a plurality of hoppers arranged in a semi-circle and each hopper adapted to contain stay sections, means for delivering a single stay section from each hopper to the strand wires, means for endwise moving each delivered stay section across two adjacent strand wires, with the ends of each stay section overlapping each other and the strand wires, and means for intercoiling the stay section ends with each other and around the strand wires, substantially as described.

20. In a wire fence machine, the combination of mechanism for intermittently advancing a plurality of strand wires, a plurality of hoppers arranged in a semi-circle and in a step relation one to the other, each hopper adapted to contain stay sections, means for feeding a stay section from each hopper, means for delivering the fed stay section to the strand wires, means for endwise moving each stay section for the ends to overlap the strand wires, and means for coiling the overlapped ends of each stay section around the strand wires, substantially as described.

21. In a wire fence machine, the combination of mechanism for intermittently advancing a plurality of strand wires, a plurality of hoppers, arranged in a semi-circle and in a step relation one to the other, each hopper adapted to contain stay wire sections, means for feeding a stay section from each hopper, means for delivering the fed stay section to the strand wires, means for endwise moving each stay section for the ends to overlap each other and the strand wires, and means for intercoiling the stay section ends with each other and around the strand wires, substantially as described.

22. In a wire fence machine, the combination of mechanism for intermittently advancing a plurality of strand wires, a plurality of fixed hoppers arranged in a semi-circle and in a step relation one to the other, each hopper adapted to contain stay sections, a pusher for removing a stay section from each hopper, and a swinging dropper for each hopper, each dropper receiving the removed stay section from each hopper and delivering the stay sections to the strand wires, substantially as described.

23. In a wire fence machine, the combination of mechanism for intermittently advancing a plurality of strand wires, a plurality of fixed hoppers arranged in a semi-circle and in step relation one to the other, each hopper adapted to contain stay sections, a pusher for removing a stay section from each hopper, a swinging dropper for each hopper, each dropper receiving the removed stay section from each hopper and delivering the stay sections to the strand wires, and means for endwise moving each dropper to have the ends of the stay sections overlap the strand wires, substantially as described.

24. In a wire fence machine, the combination of mechanism for intermittently advancing a plurality of strand wires, a plurality of fixed hoppers arranged in a semi-circle and in step relation one to the other, each hopper adapted to contain stay sections, a pusher for removing a stay section from each hopper, a swinging dropper for each hopper, each dropper receiving the removed stay section from each hopper and delivering the stay sections to the strand wires, means for endwise moving each dropper to have the ends of the stay sections overlap the strand wires, and means for returning each swinging dropper to receiving position, substantially as described.

25. In a wire fence machine, the combination of mechanism for intermittently advancing a plurality of strand wires, a plurality of hoppers arranged in a semi-circle and in step relation one to the other, each hopper adapted to contain stay sections, a pusher for removing a stay section from each hopper, a swinging dropper for each hopper, each dropper receiving the removed stay section from each hopper and delivering the stay sections to the strand wires, means for endwise moving each dropper to have the ends of the stay sections overlap the strand wires, means for returning each swinging dropper to receiving position, and a plurality of coiler heads engaging the overlapping ends of the stay sections, and coiling such ends around the strand wire, substantially as described.

26. In a wire fence machine, the combination of mechanism for intermittently advancing a plurality of strand wires, a plurality of hoppers arranged in a semi-circle and in a step relation one to the other, each hopper adapted to contain stay sections, a pusher for removing a stay section from each hopper, a swinging dropper for each hopper, each dropper receiving the removed stay section from each hopper and delivering the stay sections to the strand wires, means for endwise moving each dropper to have the ends of the stay sections overlap the strand wires, means for returning each swinging dropper to receiving position, a plurality of coiler heads engaging the overlapping ends of the stay sections for coiling such ends around the strand wires, and means for simultaneously revolving the plurality of coiler heads and coiling the ends of the stay sections around the strand wires, substantially as described.

27. In a wire fence machine, the combination of mechanism for intermittently advancing a plurality of strand wires, a plurality of hoppers arranged in a semi-circle and in step relation one to the other, each hopper adapted to contain stay sections, a pusher for removing a stay section from each hopper, a swinging dropper for each hopper, each dropper receiving the removed stay section from each hopper and delivering the stay sections to the strand wires, means for endwise moving each dropper to have the ends of the stay sections overlap the strand wires, means for returning each swinging dropper to receiving position, a plurality of coiler heads engaging the overlapping ends of the stay sections for coiling such ends around the strand wire, means for simultaneously revolving the plurality of coiler heads and coiling the endss of the stay sections around the strand wires, and means for crimping the strand wires between the stays, substantially as described.

28. In a wire fence machine, the combination of a hopper for containing stay sections, a conduit leading from the hopper bottom, a pusher for ejecting a stay section from the conduit, a dropper receiving the stay section from the conduit, and means for actuating the pusher and dropper, substantially as described.

29. In a wire fence machine, the combination of a hopper for containing stay sections, a conduit leading from the hopper bottom, a pusher for ejecting a stay section from the conduit, a dropper receiving the stay section from the conduit, means for actuating the pusher and dropper, and means for projecting forward and receding the dropper for delivery of the stay sections in position, substantially as described.

30. In a wire fence machine, the combination of a hopper for containing stay sections, a conduit leading from the hopper bottom, a pusher for ejecting a stay section from the conduit, a dropper receiving the stay section from the conduit, means for actuating the pusher and dropper, means for projecting forward and receding the dropper for delivery of the stay sections in position, and means for carrying the delivered stay sections endwise to overlie at its ends the coiler heads, substantially as described.

31. In a wire fence machine, the combination of a hopper for containing stay sections, a conduit leading from the hopper bottom, a pusher for ejecting a stay section from the conduit, a dropper receiving the stay section from the conduit, means for actuating the pusher and dropper, means for projecting forward and receding the dropper for delivery of the stay sections in position, means for carrying the delivered stay sections endwise to overlie at its ends the coiler heads, a pair of coiler heads each coiler head adapted for the passage of a strand wire, with the coiler heads arranged to receive a stay section from the hopper thereover, and means for intermittently revolving the coiler heads, substantially as described.

32. In a wire fence machine, the combination of a plurality of hoppers, each hopper containing stay sections, a conduit for each hopper leading from the bottom thereof, a pusher for ejecting a stay section from each conduit, a dropper receiving the stay section from each conduit, a reciprocating bar for actuating each pusher and each dropper, and means for reciprocating the bar, substantially as described.

33. In a wire fence machine, the combination of a plurality of hoppers, each hopper containing stay sections, a conduit for each hopper leading from the bottom thereof, a pusher for ejecting a stay section from each conduit, a dropper receiving the stay section from each conduit, a reciprocating bar for actuating each pusher and each dropper, an oscillating plate having thereon a plurality of cam grooves, one groove for each reciprocating bar, a roller for each reciprocating bar entering the cam groove, and means for oscillating the plate, substantially as described.

34. In a wire fence machine, the combination of a plurality of hoppers, each hopper containing stay sections, a conduit for each hopper leading from the bottom thereof, a pusher for ejecting a stay section from each conduit, a dropper receiving the stay section from each conduit, a reciprocating bar for actuating each pusher and each dropper, an oscillating plate having thereon a plurality of cam grooves, one groove for each reciprocating bar, a roller for each reciprocating bar entering the cam groove, a rock shaft, an arm attached to the rock shaft, and connecting means between the arm and the oscillating plate, substantially as described.

35. In a wire fence machine, the combination of a plurality of droppers, each dropper receiving a stay section, a reciprocating bar for raising and lowering each dropper, and means for reciprocating the bar, substantially as described.

36. In a wire fence machine, the combination of a plurality of droppers, each dropper receiving a stay section, a reciprocating bar for raising and lowering each dropper, an oscillating plate having thereon a plurality of cam grooves, one groove for each reciprocating bar, a roller for each reciprocating bar entering the cam groove, and means for oscillating the plate, substantially as described.

37. In a wire fence machine, the combination of a plurality of droppers, each dropper receiving a stay section, a reciprocating bar for raising and lowering each dropper, an oscillating plate having thereon a plurality of cam grooves, one groove for each reciprocating bar, a roller for each reciprocating bar entering the cam groove, a rock shaft, an arm extending out from the rock shaft, and connecting means between the arm and the oscillating plate, substantially as described.

38. In a wire fence machine, the combination of a plurality of droppers, each dropper receiving a stay section, and each dropper having a rising and falling movement given thereto, a sliding pin supporting each dropper, and means for endwise moving the sliding pin and the dropper, substantially as described.

39. In a wire fence machine, the combination of a plurality of droppers, each dropper receiving a stay section, and each dropper having a rising and falling movement given thereto, a sliding pin supporting each dropper, a pin projecting from the sliding pin, an arm engaging the projecting pin, and means for vibrating the arm and moving the sliding pin and the dropper endwise, substantially a described.

40. In a wire fence machine, the combination of a plurality of droppers, each dropper receiving a stay section, and each dropper having a rising and falling movement given thereto, a sliding pin supporting each dropper, a pin projecting from the sliding pin, an arm engaging the projecting pin, a lug on the sleeve of the vibrating arm, a pair of lugs engaging the lug of the sleeve, a reciprocating bar carrying the pair of lugs, and means for reciprocating the bar, substantially as described.

41. In a wire fence machine, the combination of a plurality of droppers, each dropper receiving a stay section, and each dropper having a rising and falling movement given thereto, a sliding pin supporting each dropper, a pin projecting from the sliding pin, an arm engaging the projecting pin, a lug on the sleeve of the vibrating arm, a pair of lugs engaging the lug of the sleeve, a reciprocating bar carrying the pair of lugs, an oscillating plate having thereon a plurality of cam grooves, one groove for each reciprocating bar, a roller on each reciprocating bar entering the cam groove, and means for oscillating the plate, substantially as described.

42. In a wire fence machine, the combination of a plurality of droppers, each dropper receiving a stay section, and each dropper having a rising and falling movement given thereto, a sliding pin supporting each dropper, a pin projecting from the sliding pin, a vibratable arm engaging the projecting pin, a lug on the sleeve of the vibratable arm, a pair of lugs engaging the lug of the sleeve, a reciprocating bar carrying the pair of lugs, an oscillating plate having thereon a plurality of cam grooves, one groove for each reciprocating bar, a roller on each reciprocating bar entering the cam groove, a rock shaft, an arm extending out from the rock shaft, and connecting means between the arm and the oscillating plate, substantially as described.

43. In a wire fence machine, the combination of a plurality of droppers, each dropper receiving a stay section, and each dropper having a rising and falling movement and an endwise movement, a pin for each dropper, a socket for the pin, a sliding bar connected with the socket, and means for reciprocating the sliding bar and advancing and receding each dropper, substantially as described.

44. In a wire fence machine, the combination of a plurality of droppers, each dropper receiving a stay section, and each dropper having a rising and falling movement and an endwise movement, a pin for each dropper, a socket for the pin, a sliding bar connected with the socket, a spring engaging the end of each sliding bar for advancing the bar, an oscillating plate having a cam edge and a depressed corner at the terminal of the cam edge, and means for oscillating the plate and receding each sliding bar, substantially as described.

45. In a wire fence machine, the combination of a plurality of droppers, each dropper receiving a stay section, and each dropper having a rising and falling movement and an endwise movement, a pin for each dropper, a socket for the pin, a sliding bar connected with the socket, a spring engaging the end of each sliding bar for advancing the bar, an oscillating plate having a cam edge and a depressed corner at the terminal of the cam edge, a rock shaft, and a connecting means between the arm and the oscillating plate, substantially as described.

46. In a wire fence machine, the combination of a plurality of droppers, each dropper having a rising and falling movement, an endwise movement and a reciprocating movement for delivering the stay sections to the strand wires and the coiler heads, a plurality of coiler heads, one coiler head for each strand wire, a pinion on the shaft of each coiler head, a gear engaging the plurality of pinions, and means for giving the gear an intermittent rotation, substantially as described.

47. In a wire fence machine, the combination of a plurality of droppers, each dropper having a rising and falling movement, an endwise movement and a reciprocating movement for delivering the stay sections to the strand wires and the coiler heads, a plurality of coiler heads, one coiler head for each strand wire, a pinion on the shaft of each coiler head, a gear engaging the plurality of pinions, a pawl on the gear, a circular ratchet engaging the pawl, and means for giving the circular ratchet a rocking movement, substantially as described.

48. In a wire fence machine, the combination of a plurality of droppers, each dropper having a rising and falling movement, an endwise movement and a reciprocating movement for delivering the stay sections to the strand wires and the coiler heads, a plurality of coiler heads one coiler head for each strand wire, a pinion on the shaft of each coiler head, a gear engaging the plurality of pinions, a pawl on the gear, a circular ratchet engaging the pawl, a rock shaft having the circular ratchet fixedly attached thereto, and means for rocking the shaft, substantially as described.

49. In a wire fence machine, the combination of a plurality of droppers, each dropper having a rising and falling movement, an endwise movement and a reciprocating movement for delivering the stay sections to the strand wires and the coiler heads, a plurality of coiler heads one coiler head for each strand wire, a pinion on the shaft of each coiler head, a gear engaging the plurality of pinions, a pawl on the gear, a circular ratchet engaging the pawl, a rock shaft having the circular ratchet fixedly attached thereto, a collar on the rock shaft, an arm extending out from the collar, a link connected with the arm, a revoluble disk, and a wrist pin on the disk having one end of the link connected thereto, substantially as described.

50. In a wire fence machine, the combination of a plurality of hoppers, each hopper containing stay sections, means for ejecting a stay section from each hopper, a plurality of droppers, one dropper for each stay section, each dropper having a rising and falling movement given thereto for carrying the stay section from the hopper to the coiler heads, and a plurality of intermittently revoluble coiler heads, substantially as described.

51. In a wire fence machine, the combination of a plurality of hoppers, each hopper containing stay sections, means for ejecting a stay section from each hopper, a plurality of droppers, one dropper for each stay section, each dropper having a rising and falling movement and an endwise movement given thereto for carrying the stay section from the hopper to the coiler heads and delivering the stay sections over the coiler heads, and a plurality of intermittently revoluble coiler heads, substantially as described.

52. In a wire fence machine, the combination of a plurality of hoppers, each hopper containing stay sections, means for ejecting a stay section from each hopper, a plurality of droppers, one dropper for each stay section, each dropper having a rising and falling movement and an endwise movement and a reciprocating movement given thereto for carrying the stay section from the hopper to the coiler heads and delivering the stay sections over the coiler heads and clearing the dropper from the stay section, and a plurality of intermittently revoluble coiler heads, substantially as described.

53. In a wire fence machine, the combination of a plurality of droppers, one dropper for each stay section, and each dropper delivering a stay section from a hopper to the coiler heads, a plurality of intermittently revoluble coiler heads, and a crimping roller, receiving, crimping and advancing the strand wires, substantially as described.

54. In a wire fence machine, the combination of a plurality of droppers, one dropper for each stay section, and each dropper delivering a stay section from a hopper to the coiler heads, a plurality of intermittently revoluble coiler heads, and a crimping roller consisting of rows of blocks arranged in series, with a notch between adjoining blocks for receiving, crimping and advancing the strand wires, substantially as described.

55. In a wire fence machine, the combination of a plurality of droppers, one dropper for each stay section, and each dropper delivering a stay section from a hopper to the coiler heads, a plurality of intermittently revoluble coiler heads, a crimping roller consisting of rows of blocks arranged in series, with a notch between adjoining blocks for receiving, crimping and advancing the strand wires, a cam for engaging and moving each row of blocks endwise in one direction, and a pressing finger for each row of blocks for moving the blocks endwise in the opposite direction, substantially as described.

56. In a wire fence machine, the combination of a plurality of droppers, one dropper for each stay section, and each dropper delivering a stay section from a hopper to the coiler heads, a plurality of intermittently revoluble coiler heads, a crimping roller, receiving, crimping and advancing the strand wires, and a take-up roller operating between the coiler heads and the crimping rollers for giving the strand wires an intermittent advance, substantially as described.

57. In a wire fence machine, the combination of a plurality of droppers, one dropper for each stay section, and each dropper delivering a stay section from a hopper to the coiler heads, a plurality of intermittently revoluble coiler heads, a crimping roller, receiving, crimping and advancing the strand wires, a take-up roller operating between the coiler heads and the crimping rollers for giving the strand wires an intermittent advance, and a spool for the completed fabric, substantially as described.

58. In a wire fence machine, the combination of a plurality of droppers, one dropper for each stay section, and each dropper delivering a stay section from a hopper to the coiler heads, a plurality of intermittently revoluble coiler heads, a crimping roller receiving, crimping and advancing the strand wires, a take-up roller operating between the coiler heads and the crimping rollers for giving the strand wires an intermittent advance, a spool for the completed fabric, and a series of electric contacts between the crimping roller and the spool for controlling an electric motor and stopping the operation of the machine, substantially as described.

59. In a wire fence machine, the combination of a main driving shaft, a train of gear driven from the main driving shaft, a continuously revoluble shaft driven from the train of gear, a disk on the continuously revoluble shaft, a wrist pin on the disk, a connecting link, an arm having the connecting link pivoted thereto, a collar for the arm, a vertical shaft having the collar fixedly attached thereto and rocked from the arm, the link and the disk, an arm fixedly attached to the upper end of the rock shaft, a plate having a plurality of cam grooves, connecting means between the arm and the plate, a plurality of reciprocating bars, and a plurality of stay section droppers, each dropper raised and lowered by a reciprocating bar, substantially as described.

60. In a wire fence machine, the combination of a main driving shaft, a train of gear driven from the main driving shaft, a continuously revoluble shaft driven from the train of gear, a disk on the continuously revoluble shaft, a wrist pin on the disk, a connecting link, an arm having the connecting link pivoted thereto, a collar for the arm, a vertical shaft having the collar fixedly attached thereto, and rocked from the arm, the link and the disk, a circular ratchet rigidly attched to the rock shaft, pawls engaging the circular ratchet, a gear carrying the pawls, a plurality of coiler heads, each coiler head having a shaft, and a pinion on each shaft engaged by the gear for intermittently revolving the coiler heads, substantially as described.

GEORGE E. MIRFIELD.

Witnesses:
  OSCAR W. BOND,
  THOMAS A. BANNING